ELECTRONIC SWITCH

Filed Nov. 29, 1965

United States Patent Office 3,466,462

Patented Sept. 9, 1969

3,466,462

ELECTRONIC SWITCH

Graham John Hounsome, Feltham, England, assignor to Epsylon Research and Development Company Limited, Bedfont, Feltham, England, a British company Filed Nov. 29, 1965, Ser. No. 510,248

Claims priority, application Great Britain, Nov. 30, 1964, 48,493/64

Int. Cl. H03k *17/56*

U.S. Cl. 307—240 3 Claims

ABSTRACT OF THE DISCLOSURE

Electronic switch comprising a transformer whose primary winding is in series with the collector of an input transistor and a D.C. source, a second D.C. source connected to the collector of the input transistor, and a chopper transistor as switching element activated by the transformer secondary winding. A switching pulse applied to the input transistor allows current to flow from the first source through the transformer primary and the input transistor and from the second source directly through the input transistor, and at the end of the switching pulse current flows from the second source through the transformer primary in the opposite direction. This provides the maximum switching period for the chopper transistor.

This invention relates to an electronic switch, and more particularly to an electronic switch including a so-called chopper transistor, which is a recently introduced type.

The chopper transistor has a base and a collector and two emitters, and its characteristic is that if a current flows between the collector and the base, then current is permitted to flow in either direction between the two emitters, but if there is no current flowing between the collector and the base then the resistance between the two emitters is extremely high, so that the two emitters may readily be incorporated in a circuit in which they act as a switch, the switch being controlled by passing current between the collector and the base.

The chopper transistor is particularly useful for momentary switching operations to produce a current pulse in the circuit in which it is connected, and the present invention is concerned with an electronic switch incorporating a chopper transistor for this purpose.

The invention consists of an electronic switch comprising an input transistor forming a gate to which an initial switching pulse may be applied, a transformer having its primary winding connected in series with the collector/emitter circuit of the input transistor and a source of direct current, a chopper transistor having a base, a collector and two emitters which permits current to flow in either direction between its emitters when a current flows in its collector/base circuit, and a secondary winding on the transformer having its ends connected respectively to the base and collector of the chopper transistor.

The transformer may have two or more secondary windings each connected to a chopper transistor to form a double or multiple pole switch.

Preferably a diode is connected across the primary winding of the transformer in such a sense that it allows current to pass to permit the transformer field to collapse rapidly at the end of the initial switching pulse.

According to a particular feature of the invention, a second direct current source of higher voltage is connected to the junction of the transformer primary winding and the collector/emitter circuit of the input transistor, so that when the input transistor becomes conductive current passes from the first source through the transformer winding and the collector/emitter circuit of the input transistor, and current also passes from the second source through the collector/emitter circuit of the input transistor, and when the input transistor becomes non-conductive at the end of an initial switching pulse current flows from the second source through the transformer winding to the first source, whereby the direction of current through the transformer primary winding is reversed and its core is driven from magnetic saturation in one sense to magnetic saturation in the other sense, so that the maximum switching period is obtained.

In order that the invention may be fully understood in all its aspects one example thereof will now be described with reference to the accompanying drawings, in which—

Figure 1:
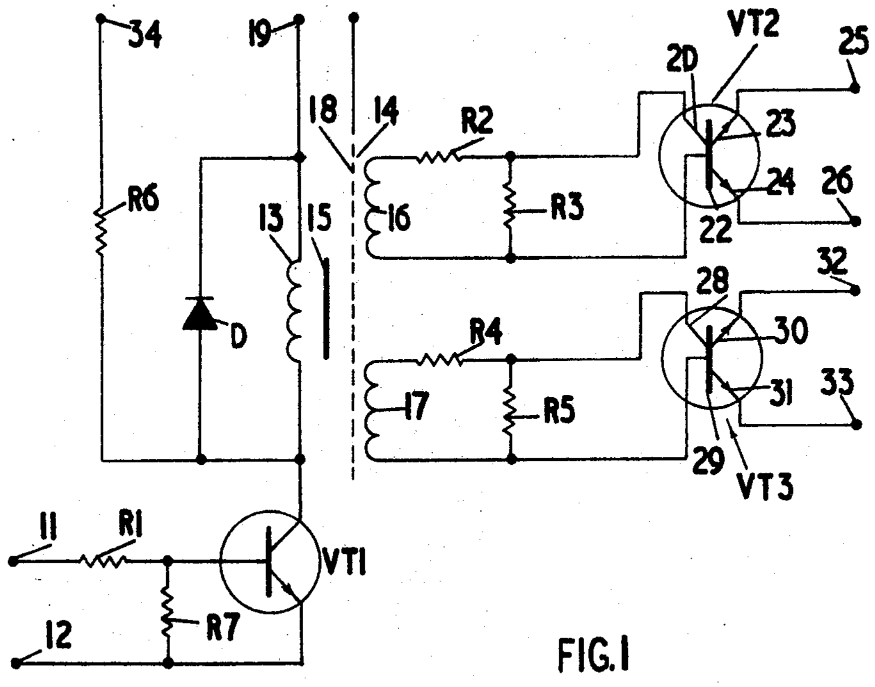
FIGURE 1 is a circuit diagram of an electronic switch according to the invention.

Referring initially to FIGURE 1, there is shown a transistor VT1 of n-p-n type having its base connected to a terminal 11 through a resistor R1 and having its emitter connected to a terminal 12, which may conveniently be grounded and is connected to the negative pole of a direct current source. A resistor R7 is connected between the base and the emitter of VT1. For operating the electronic switch according to the invention an initial switching pulse is applied between the terminals 11 and 12, the transistor VT1 acting as a gate.

Connected to the collector of VT1 is the primary winding 13 of a transformer, generally indicated by reference 14, having a core 15 made of a high permeability alloy, such as one of the alloys in the range known by the registered trademark Permalloy. The transformer 14 is also provided with two secondary windings, respectively 16 and 17, since the embodiment being described relates to a double pole electronic switch. For a single pole switch only one secondary winding is required, whereas if it is desired to provide a triple pole switch, for example, then three secondary windings are provided. A screen 18, indicated by dotted lines, is interposed between the primary and secondary windings. The other end of the primary winding 13 is connected to a terminal 19 which represents a direct source. In the embodiment being described the source 19 is conveniently six volts.

Connected across the primary winding 13 is a diode D arranged with such polarity that it will not pass current from the direct current source 19.

One end of the secondary winding 16 is connected through a resistor R2 to the collector 20 of a chopper transistor VT2. The chopper transistor VT2 is provided with the collector 20, a base 22 and two emitters, respectively 23 and 24. The other end of the secondary winding 16 is connected to the base 22 of chopper transistor VT2. A resistor R3 is connected between the collector and the base of chopper transistor VT2. The two emitters 23 and 24 of chopper transistor VT2 are respectively connected to terminals 25 and 26, which may be connected in a circuit which is to be switched.

One end of a second secondary winding 17 of transformer 14 is connected through a resistor R4 to the collector 28 of a second chopper transistor VT3 and the other end of the said second secondary winding 17 is connected directly to the base 29 of chopper transistor VT3. A resistor R5 is connected between the collector of the base of chopper transistor VT3. The two emitters 30 and 31 of chopper transistor VT3 are respectively connected to terminals 32 and 33, which may be connected in a second circuit which is to be switched.

The characteristics of both of the chopper transistors

VT2 and VT3 are that if a pulse of the correct polarity appears at the transformer windings 16 and 17, current will flow between the collector and base of each chopper transistor and, while this current flows, current may also flow in either direction between the terminals 25 and 26 and the terminals 32 and 33. On the other hand, when no current flows between the collector and base of the chopper transistor, the resistance between the terminals 25 and 26 or 32 and 33 is extremely high, so that the chopper transistor acts as a switch having a very low resistance when it is closed and an extremely high resistance when it is open.

A second direct source, of higher voltage than the said source 19, is represented by a terminal 34 and in the embodiment being described this may conveniently be 12 volts. A resistor R6 is connected between the second source 34 and the junction between the said one end of the primary winding 13 and the collector/emitter circuit of VT1.

In operation assuming that terminals 25 and 26 are connected in one circuit which is to be switched and that terminals 32 and 33 are connected in another circuit which is to be switched, the two circuits will initially be open. In order to close them both for a short time an initial switching pulse is applied between the terminals 11 and 12 associated with VT1. VT1 is normally non-conductive and the application of the pulse causes it to become conductive. Hence, current flows from source 19 through primary winding 13 and through the collector/emitter circuit of VT1. The build-up of flux in the core 15 induces voltages in secondary windings 16 and 17, so that current flows in the collector/base circuits of VT2 and VT3 and this allows current to flow between terminals 25 and 26 and between terminals 32 and 33 of the chopper transistors, whereby their associated circuits are closed. At the end of the initial pulse, transistor VT1 becomes non-conductive and the field in the core 15 collapses. In order to assist the collapse of this field the diode D is provided, and current flows through this diode until the field has subsided.

The purpose of the second direct current source 34 will now be explained with reference to FIGURE 2 and FIGURE 3.

Figures 2, 3:
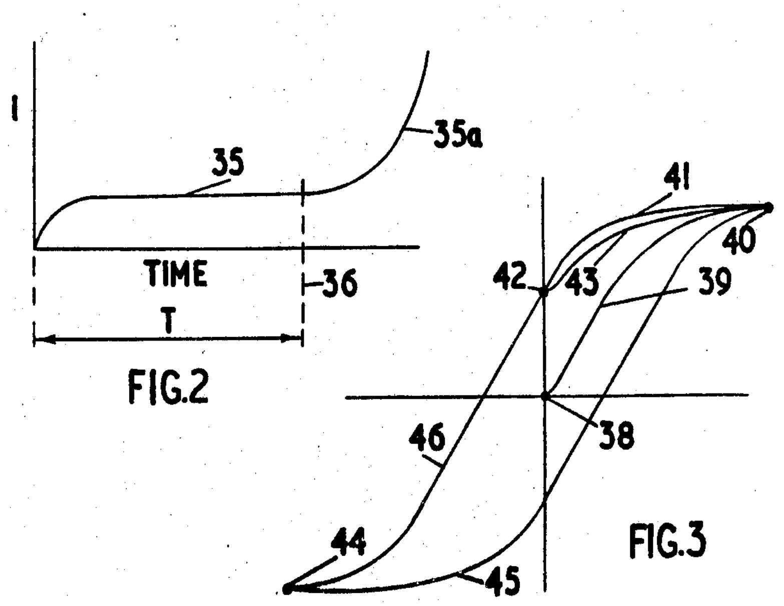
FIGURE 2 is a graph of the current in the collector/emitter circuit of the input transistor during the application of an initial switching pulse.
FIGURE 3 is a hysteresis loop diagram to assist explanation of the action of one form of switch according to the invention.

Referring first to FIGURE 2, when an initial pulse is applied to terminal 11 and VT1 begins to conduct, the current in its collector/emitter circuit is as shown in FIGURE 2, which is a graph of the current in the collector/emitter circuit of VT1 plotted to a base of time. The current curve is approximately as shown by the curve 35, that is to say, it rises from zero to a certain level and continues substantially at that level while the core 15 is being magnetized, until a point 36 is reached at which the core 15 becomes saturated. After that, the current in the collector/emitter circuit of VT1 rises rapidly, as shown by the portion 35*a* of this curve. The maximum useful length of the initial pulse is the time T. The useful time period T between the beginning of the application of the initial pulse of the point 36 depends upon the size of the core. In order to obtain a pulse of a given length of time at the switching terminals of VT2 and VT3, the core must be made of sufficient size to make the time period T of adequate length.

Referring now to FIGURE 3, there is shown a hysteresis loop for the core 15. In the absence of the second source 34 and with VT1 cut off, the magnetization of the core 15 is at the point 38, that is, zero. The application of an initial pulse causes the magnetization of the core to rise along the line 39 until the saturation point 40 is reached, and at the end of the initial pulse of VT1, the magnetization will move back along the portion 41 of the loop until it reaches the point 42. The application of a further initial pulse at VT1 will cause the magnetization of the core 15 to follow the curve 43. Thus only a small part of the total magnetization range of the core is used under these conditions.

A particular feature of the invention resides in the provision of the second direct current source 34. When the power is first switched on, current flows from the source 34 through R6 and through the primary winding 13 to the source 19, and this magnetizes the core 15 to saturation in the opposite sense, as indicated by the point 44. When the initial pulse is applied to terminals 11, and VT1 becomes conductive, current flows from the source 19 through the transformer primary winding 13 and the emitter/collector circuit of VT1 and drives the core 15 from the point 44 to the point 40 along the half 45 of the hysteresis loop. Since the full range of magnetization of the core 15 is being traversed the time T (FIGURE 2) is very substantially longer. During this period current also flows from the second source 34 through resistor R6 and through the collector/emitter circuit of VT1. At the end of the initial pulse, when VT1 is cut off, current again flows from the source 34 through the transformer primary winding 13 to the source 19, so that the magnetization of the core 15 now follows the other half, 41 and 46, of the hysteresis loop until it again reaches the point 44. By the provision of this second source it becomes possible, in a given application, to use a transformer having a core which may only be a quarter of the size of the core which would be required in the absence of the source 34.

The diode D is a silicon diode and the resistance of the transformer primary winding 13 and that of the resistor R6 are so chosen that the voltage drop due to the current flowing from the source 34 in the winding 13 is below the threshold voltage at which the diode D conducts. Consequently the diode D is only conductive at the end of an initial pulse to allow the field of the core 15 to collapse.

It will be clear that modification, within the scope of the invention as claimed hereinafter, may be made in the embodiments described.

I claim:

1. An electronic switch comprising an input transistor forming a gate to which an initial switching pulse may be applied, a transformer having its primary winding connected in series with the collector/emitter circuit of the input transistor and a source of direct current, a second direct current source of higher voltage than the said source, the second source being connected to the junction of the transformer primary winding and the collector/emitter circuit of the input transistor, a chopper transistor having a base, a collector and two emitters which permits current to flow in either direction between its emitters when a current flows in its collector/base circuit, and a secondary winding on the transformer having its ends connected respectively to the base and collector of the chopper transistor, so that when the input transistor becomes conductive due to the application of an initial switching pulse current passes from the first source through the transformer primary winding and the collector/emitter circuit of the input transistor, and current also passes from the second source through the collector/emitter circuit of the input transistor, and when the input transistor becomes non-conductive at the end of the initial switching pulse current flows from the second source through the transformer primary winding to the first source whereby the direction of current through the transformer primary winding is reversed and the transformer core is driven from magnetic saturation in one sense to magnetic saturation in the other sense so that the maximum switching period is obtained.

2. A switch as claimed in claim 1 in which the voltage of the second source is double that of the first source, and the value of the resistor is such that the current through the transistor primary winding is substantially the same in both directions.

3. A switch as claimed in claim 1 comprising a diode connected across the primary winding of the transformer in such a sense as to allow current to pass to permit the transformer field to collapse rapidly at the end of the initial switching pulse.

References Cited

UNITED STATES PATENTS

| | | | |
|---|---|---|---|
| 3,043,965 | 7/1962 | Scarbrough et al. ---- | 307—282 |
| 3,048,715 | 8/1962 | Horton ------------ | 307—282 |

OTHER REFERENCES

The Inch—Discussion and Applications, Mitchell & Bell, p. 41, October 1962.

ARTHUR GAUSS, Primary Examiner

DAVID M. CARTER, Assistant Examiner

U.S. Cl. X.R.

307—88, 246, 268, 314